Nov. 29, 1932.　　　L. W. V. DORRIEN　　　1,889,276
DOMESTIC RODENT EXTERMINATOR
Filed Aug. 10, 1931
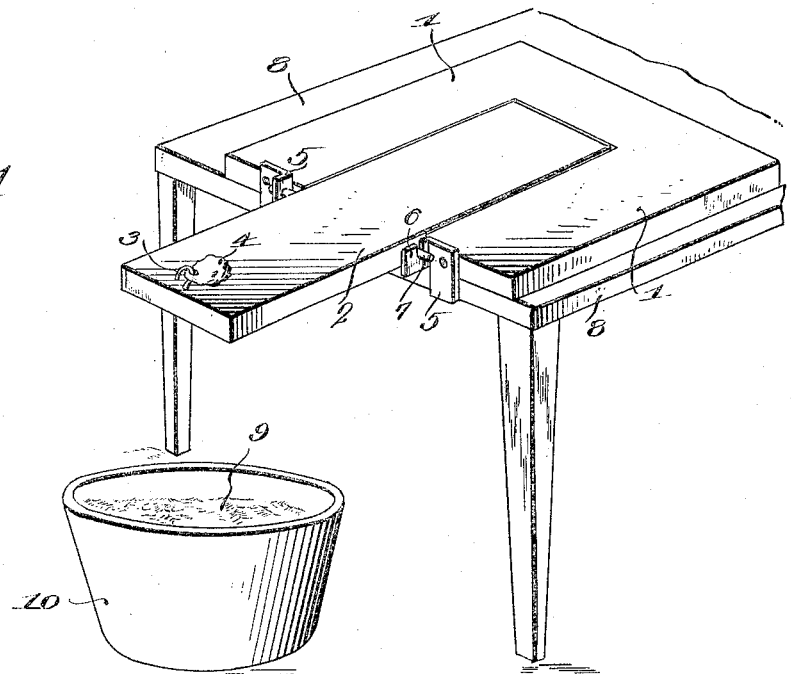
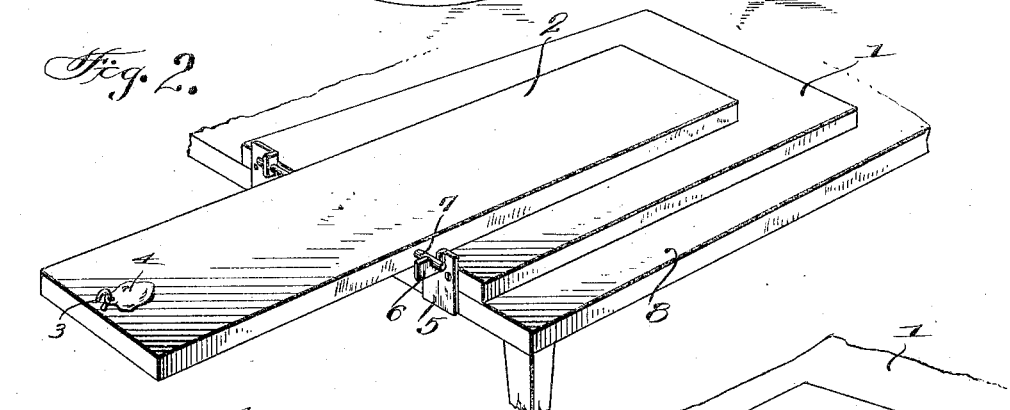
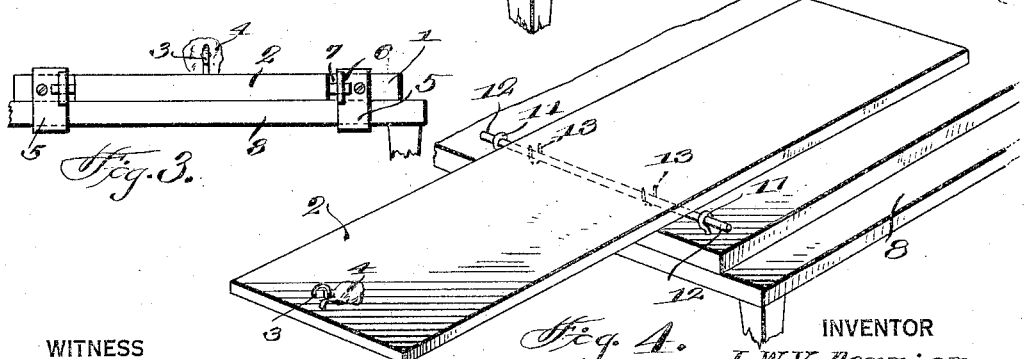
INVENTOR
L. W. V. Dorrien
BY
ATTORNEY
WITNESS Patented Nov. 29, 1932

1,889,276

UNITED STATES PATENT OFFICE

LIEBERT W. v. DORRIEN, OF MEXICO, MEXICO

DOMESTIC RODENT EXTERMINATOR

Application filed August 10, 1931. Serial No. 556,229.

My invention relates to improvements in rodent exterminators, and it consists in the combinations, constructions and arrangements herein described and claimed.

An object of my invention is to provide a simple and inexpensive device which may be applied to any suitable support such as a table, a chair, a drain board box or the like, where rats, mice or domestic rodents are more likely to congregate, and which will operate efficiently to dispose of them.

A further object of my invention is to provide a device of the type described which is simple in construction, and which can be manufactured at a minimum cost.

A further object is to provide a device of the type described which depends for its efficient operation upon gravity, thereby dispensing with springs, which not only get out of order but which add to the cost of the ordinary rat trap and which may injure fingers while setting, the device being automatic or continuous in operation.

Other objects and advantages will appear in the following specification and the novel features of the invention will be particularly pointed out in the appended claims.

My invention is illustrated in the accompanying drawing forming a part of this application, in which:

Figure 1 is a perspective view of one form of the device in position for use.

Figure 2 is a perspective view of a modified form.

Figure 3 is a front view of the form shown in Fig. 1, and

Figure 4 is a view of another modified form of the device.

In carrying out my invention I provide a base plate 1 of any suitable shape such as the rectangular plate shown in Figures 1 and 2. This base plate is preferably made of wood, but it may be made of any suitable material.

In the drawing I have shown this pivotal attachment as consisting of brackets 5 which are attached to the base 1 and which have laterally extending slotted ears 6 constituting journals arranged to receive pivot pins or trunnions 7 carried by the platform 2. The pivot pins 7 are normally arranged so that the bait platform 2 is in the position shown in Figure 1. In this figure it will be observed that the base 1 has a cut-away portion to permit the platform to lie flush with the upper surface of the base when the latter is placed on a support such as the table 8. The brackets 5 extend downwardly and act as stop members or guide members for positioning the trap at the desired point.

From the foregoing description of the various parts of the device, the operation thereof will be readily understood. The bait 4 is placed in the hook 3, as shown in Figure 1, and the base 1 is placed on the table so that the lower portions of the brackets 5 engage the edge. The rat, mouse or other rodent in order to get at the bait will walk along the platform 2 until his weight overbalances the platform, which will then turn so as to dump the animal into the water lying in the receptacle 10 which is placed in such a position as to receive the animal when the platform is tilted. Here the animal will be drowned and can be removed at leisure. By placing some oil on top of the water, air will be excluded and the animal will die a practically painless death. On being relieved of the weight of the animal, the platform will automatically resume its normal position.

The use of this device leaves the trap portion always in a clean and sanitary condition as distinguished from those traps which kill the animal by a blow or catches them alive. In such traps the dead animals usually scare away the other animals, whereas in the present instance such is not the case. Furthermore, parasites such as fleas and lice, are drowned with the animal, and can do no harm. In traps where animals are caught alive or killed by a blow, these parasites may be set free and spread disease, such as bubonic plague.

In Figure 2 I have shown a modification in which the base 1 has no cutaway portion. In this figure the platform 2 rests on the base and the brackets 5 of the pivot pin 7 are slightly raised as compared with the portion shown in Figure 1. The view shows the normal position of the trap.

In Figure 4 I have shown a modified form of the device in which the base plate 1 is provided with eyes 11, arranged to receive the ends of a pivot rod 12 which is secured to the underportion of the platform 2 by means of staples 13. In this form of the device the edge of the base is placed at the ends of the table 8. In the modified form the action is the same. When the animal ventures out to get the bait the platform tilts and the animal is dumped into the water and is drowned.

Having now particularly described and ascertained the nature of the invention, and in what manner the same is to be performed, what is claimed is:

1. An animal trap comprising a flat plate, journals carried by said plate at one end thereof, downwardly extending stop members adapted to engage the edge of a support to properly position the trap, and a platform having laterally extending trunnions arranged to engage the journals to permit the tilting of the platform by the weight of the animal.

2. An animal trap comprising a flat plate, brackets secured to one end thereof and extending downwardly, journals carried by the brackets and a platform having laterally extending trunnions arranged to engage the journals to permit the tilting of the platform by the weight of the animal.

3. An animal trap comprising a flat plate, brackets secured to said plate at one end thereof, said brackets being extended downwardly and being arranged to engage the support to properly position the trap, flanges carried by the brackets and having journals and a platform having laterally extending trunnions arranged to engage the journals to permit the tilting of the platform by the weight of the animal.

4. An animal trap comprising a flat plate having a cut-away portion, brackets secured to the end of the plate on each side of said cut-away portion, said brackets being extended downwardly to form stop members arranged to engage a support for properly positioning the trap, flanges carried by said brackets and being provided with journals, a platform having a portion disposed normally in said cut-away portion, the top of the platform being normally flush with the top of the plate and trunnions carried by the platform and engaging said journals for permitting the tilting of the platform by the weight of the animal.

LIEBERT W. v. DORRIEN.